United States Patent
Yamada et al.

(10) Patent No.: US 8,711,586 B2
(45) Date of Patent: Apr. 29, 2014

(54) POWER CONVERTER AND METHOD INCLUDING NOISE SUPPRESSION BY CONTROLLING PHASE SHIFTING OF CONVERTER CELLS

(75) Inventors: Yoichiro Yamada, Hitachi (JP); Shuji Katoh, Hitachiota (JP); Shigenori Inoue, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 291 days.

(21) Appl. No.: 12/839,590

(22) Filed: Jul. 20, 2010

(65) Prior Publication Data

US 2011/0019442 A1 Jan. 27, 2011

(30) Foreign Application Priority Data

Jul. 21, 2009 (JP) ................................. 2009-169684

(51) Int. Cl.
*H02M 7/49* (2007.01)
*H02M 1/12* (2006.01)

(52) U.S. Cl.
USPC ................................. 363/41; 363/71; 363/98

(58) Field of Classification Search
USPC ............... 363/39, 43, 44, 68, 71, 87, 98, 127, 363/132, 41
See application file for complete search history.

(56) References Cited

U.S. PATENT DOCUMENTS

| | | | | |
|---|---|---|---|---|
| 5,327,335 A * | 7/1994 | Maddali et al. | ................. | 363/39 |
| 5,777,865 A * | 7/1998 | Nemoto et al. | ................ | 363/124 |
| 6,101,109 A * | 8/2000 | Duba et al. | ...................... | 363/71 |
| 6,643,156 B2 * | 11/2003 | Zubieta | ......................... | 363/132 |
| 2003/0137857 A1 * | 7/2003 | Yamanaka et al. | ............ | 363/132 |
| 2010/0091419 A1 * | 4/2010 | Vedula et al. | ................... | 361/47 |
| 2011/0044082 A1 * | 2/2011 | Norrga et al. | ................. | 363/127 |
| 2011/0222323 A1 * | 9/2011 | Dofnas et al. | ................... | 363/71 |

FOREIGN PATENT DOCUMENTS

| | | |
|---|---|---|
| JP | 01-136570 | 5/1989 |
| JP | 03-183324 | 8/1991 |
| JP | 09-019170 | 1/1997 |
| JP | 10-285909 | 10/1998 |
| JP | 2002-064983 | 2/2002 |
| JP | 2002-532048 | 9/2002 |
| JP | 2003-033039 | 1/2003 |
| JP | 2006-042557 | 2/2006 |
| JP | 2008-067566 | 3/2008 |
| WO | WO00/33448 | 6/2000 |
| WO | WO2009/087063 | 7/2009 |

OTHER PUBLICATIONS

Office Action in JP 2009-169684, mailed Nov. 1, 2011, (in Japanese, 2 pgs.), [with partial translation of Office Action].

(Continued)

*Primary Examiner* — Adolf Berhane
*Assistant Examiner* — Fred E Finch, III
(74) *Attorney, Agent, or Firm* — Antonelli, Terry, Stout & Kraus, LLP.

(57) ABSTRACT

The noise generated from a power converter is suppressed by increasing the noise frequency to a level not lower than the maximum frequency of the human audible range. To obtain the frequency of an output current harmonic component as a noise source which has exceeded the maximum frequency of the human audible range, it is adequate to determine that the frequency of a driving carrier wave for the individual converter cells in the power converter, in which the phases of the carrier wave for the converter cells are mutually shifted by a given value between the converter cells, meets the following equation.

20 Claims, 14 Drawing Sheets

(56) References Cited

OTHER PUBLICATIONS

Okada et al.; Series Connection of Snubberless IGBTs for 6.6 kV Transformerless Converters, IEEE 2007, pp. 1686-1691.

Office Action in Chinese Patent Appln. 201010227920.9, mailed Oct. 10, 2012, (in Chinese, 11 pgs.), [including partial English language translation, 1 pg.].

\* cited by examiner

POWER CONVERTER AND METHOD INCLUDING NOISE SUPPRESSION BY CONTROLLING PHASE SHIFTING OF CONVERTER CELLS

CROSS-REFERENCE TO RELATED APPLICATION

The present invention is related to PCT application No. PCT/JP2010/052833 filed on Feb. 24, 2010, claiming the invention priority based on Japanese Patent Application No. 2009-080856, filed on Mar. 30, 2009.

BACKGROUND OF THE INVENTION

The present invention relates to a power converter which has converter cells configured by cascade connection, and more particularly to a power converter which suppresses a problem resulting from output current harmonics.

A conventional power converter has a multiple transformer to increase the output voltage to a high level and it is linked with an AC system. Since the multiple transformers are large in weight and volume, the whole apparatus has a large weight and volume as a result.

SUMMARY OF THE INVENTION

Since the conventional power converter is hard to output a high voltage and uses the multiple transformer to link with the AC system, the whole apparatus results in increasing its weight and volume. Especially, since the power converter is mounted on a power pole when it is used for power distribution, the increase in weight and volume of the apparatus is a big issue to be solved. To solve the problem, research and development have been conducted in a power converter which can be linked with a distribution system without using a transformer by connecting elements including IGBT (Insulated Gate Bipolar Transistor) in series to increase the output voltage as disclosed in "Series Connection of Snubberless IGBTs for 6.6 kV Transformerless Converter", J. Narushima, IEEE/PCC Nagoya 2007. But, the above power converter produces an output current having a large harmonic component because the output voltage has a pulse state. When the current harmonic is large, a magnetomotive force is variable in the reactor or the like of the distribution system and the reactor is vibrated to generate noise. Since this reactor is directly connected to the distribution system through an electric cable, the same vibration is propagated to a distribution line, a power pole and others, which also become noise sources. In a case where the reactor is used for electric power distribution, it is installed in a residential area, so that noise generation is a particularly serious problem, and the above-described noise reduction was a big technical object.

To achieve the above object, the present invention provides a power converter provided with a plurality of arms which are comprised of a plurality of converter cells connected in cascade, comprising means for mutually shifting phases of carrier waves of the converter cells by a prescribed value between the converter cells in the arms; and means for operating frequencies of the carrier waves of the converter cells in a state larger than a value which is obtained by dividing a maximum frequency of a human audible frequency band by the number of the converter cells in the arms.

The power converter of the present invention also comprises interconnected reactors; buffer reactors; arms configured of a plurality of converter cells connected in cascade; a control device for controlling the converter cells; and a signal line for transmitting a control signal from the control device to the converter cells, wherein the arms are arranged on positive and negative sides of each of three phases.

The power converter of the present invention also has the converter cell which is provided with a capacitor for storing electric power; fuses for cutting off the electric current in case of overcurrent; a cell configured with a plurality of switching elements connected in a half bridge state; a converter cell control circuit for outputting a control signal for the switching elements; a gate driver for applying a voltage to the switching elements according to the control signal outputted from the converter cell control circuit; a gate power supply for supplying necessary electric power to the gate driver; and a self-feeding supply for supplying necessary electric power to the gate power supply and the converter cell control circuit.

The power converter of the present invention also comprises a synchronous signal generator for generating a synchronous signal at every given time; a carrier wave generator for generating a carrier wave for the converter cell after having as an input the synchronous signal which is outputted from the synchronous signal generator; and an individual-phase target voltage generator for generating a target voltage of each of three phases which are mutually shifted by ⅓ cycle.

The power converter of the present invention also has the converter cell control circuit which is provided with a comparator which outputs to the gate driver an ON/OFF signal for the switching elements according to a magnitude relation between the target voltage and the carrier wave for the converter cell.

The power converter of the present invention also has the converter cell which is provided with a capacitor for storing electric power; fuses for cutting off the electric current in case of overcurrent; a cell configured with a first leg and a second leg, which are configured with a plurality of switching elements connected in series, connected in a full bridge state; a converter cell control circuit for outputting a control signal for the switching elements; a gate driver for applying a voltage to the switching elements according to the control signal outputted from the converter cell control circuit; a gate power supply for supplying necessary electric power to the gate driver; and a self-feeding supply for supplying necessary electric power to the gate power supply and the converter cell control circuit.

The power converter of the present invention also comprises a synchronous signal generator for generating a synchronous signal at every given time; a carrier wave generator for generating a carrier wave for the converter cell after having as an input the synchronous signal which is outputted from the synchronous signal generator; a first individual-phase target voltage generator for generating a target voltage of each of three phases which are mutually shifted by ⅓ cycle; and a second individual-phase target voltage generator for outputting a target voltage with the phase shifted by ½ cycle with respect to the target voltage which is outputted from the first individual-phase target voltage generator.

The power converter of the present invention also has the converter cell control circuit which is provided with a first comparator for generating an ON/OFF signal for the switching elements configuring the first leg according to the magnitude relation between the target voltage outputted from the first individual-phase target voltage generator and the carrier wave for the converter cell outputted from the carrier wave generator; and a second comparator for generating an ON/OFF signal for the switching elements configuring the second leg according to the magnitude relation between the target voltage outputted from the second individual-phase target voltage generator and the carrier wave for the converter cell outputted from the carrier wave generator.

The power converter of the present invention also comprises a synchronous signal generator for generating a synchronous signal at every given time; and an individual-phase target voltage generator for generating a target voltage of each of three phases which are mutually shifted by ⅓ cycle.

The power converter of the present invention also has the converter cell control circuit which is provided with a carrier wave generator for outputting a carrier wave for the converter cell after having as an input the synchronous signal which is outputted from the synchronous signal generator; and a comparator for generating an ON/OFF signal for the switching elements according to the magnitude relation between the carrier wave for the converter cell outputted from the carrier wave generator and the target voltage outputted from the individual-phase target voltage generator.

The power converter of the present invention also has the control device which is provided with a synchronous signal generator for generating a synchronous signal at every given time; a first individual-phase target voltage generator for generating a target voltage of each of three phases which are mutually shifted by ⅓ cycle; and a second individual-phase target voltage generator for outputting a target voltage with the phase shifted by ½ cycle with respect to the target voltage which is outputted from the first individual-phase target voltage generator.

The power converter of the present invention also has the converter cell control circuit which is provided with a carrier wave generator for outputting a carrier wave for the converter cell after having as an input the synchronous signal which is outputted from the synchronous signal generator; a first comparator for generating an ON/OFF signal for the switching elements configuring the first cell according to the magnitude relation between the target voltage outputted from the first individual-phase target voltage generator and the carrier wave for the converter cell outputted from the carrier wave generator; and a second comparator for generating an ON/OFF signal for the switching elements configuring the second cell according to the magnitude relation between the target voltage outputted from the second individual-phase target voltage generator and the carrier wave for the converter cell outputted from the carrier wave generator.

The power converter of the present invention also has the control device which is provided with an individual-phase target voltage generator for generating a target voltage of each of three phases which are mutually shifted by ⅓ cycle; a synchronous signal generator for generating a synchronous signal at every given time; a carrier wave generator for generating a carrier wave for the converter cell after having as an input the synchronous signal which is outputted from the synchronous signal generator; and a comparator which outputs to the converter cell control circuit an ON/OFF signal for the switching element according to a magnitude relation between the target voltage and the carrier wave for the converter cell.

The power converter of the present invention also has the control device which is provided with a first individual-phase target voltage generator for generating a target voltage of each of three phases which are mutually shifted by ⅓ cycle; a second individual-phase target voltage generator for outputting a target voltage with the phase shifted by ½ cycle with respect to the target voltage which is outputted from the first individual-phase target voltage generator; a synchronous signal generator for generating a synchronous signal at every given time; a carrier wave generator for generating a carrier wave for the converter cell after having as an input the synchronous signal which is outputted from the synchronous signal generator; a first comparator for generating an ON/OFF signal for the switching elements configuring a first leg according to the magnitude relation between the target voltage outputted from the first individual-phase target voltage generator and the carrier wave outputted from the carrier wave generator; and a second comparator for generating an ON/OFF signal for the switching elements configuring a second leg according to the magnitude relation between the target voltage outputted from the second individual-phase target voltage generator and the carrier wave outputted from the carrier wave generator.

The power converter of the present invention also comprises a transformer; a buffer reactor; arms configured of a plurality of converter cells connected in cascade; a control device for controlling the converter cells; and a signal line for transmitting a control signal from the control device to the converter cells, wherein the arms are arranged on each of three phases.

The power converter of the present invention also has the control signal between the control device and the converter cell control circuit which is transmitted wirelessly instead of through the signal line.

According to the invention, to suppress the noise generated by the interconnected reactor and the like of the distribution system, the power converter having a plurality of converter cells, which are configured of an IGBT and the like, cascade connected for individual phases is linked with the distribution system, and the interconnected reactor is disposed between them. At this time, the noise frequency is increased to a level not lower than the maximum frequency of the human audible range to suppress the noise generated from the above-described power converter. To do so, the frequency of an output current harmonic component which is the above-described noise source needs to exceed the maximum frequency of the human audible range. To obtain the frequency of the output current harmonic component which has exceeded the maximum frequency of the human audible range, it is adequate to determine that the frequency of a driving carrier wave for each converter cell in the power converter in which the phases of the carrier waves of the converter cells are mutually shifted by a given value between the converter cells meets the following equation (1):

$$f_{carrier} \geq f_{audibility\_max} \div N \qquad (1)$$

where, $f_{carrier}$ is the frequency of the converter cell carrier wave, $f_{audibility\_max}$ is the maximum frequency of the human audible range, and N is the number of the converter cells cascade connected for each phase.

According to the power converter of the invention, since the frequency of the output current harmonic component which was the cause of the noise exceeds the human audible range, the sound cannot be recognized by a human being, and the noise suppression can be realized as a result.

Other objects, features and advantages of the invention will become apparent from the following description of the embodiments of the invention taken in conjunction with the accompanying drawings.

DETAILED DESCRIPTION OF THE INVENTION

One embodiment of the invention is described below with reference to the drawings. The following embodiment shows one mode of the invention and the invention also includes other modes without departing from the scope of the invention.

[Embodiment 1]

Figure 1:
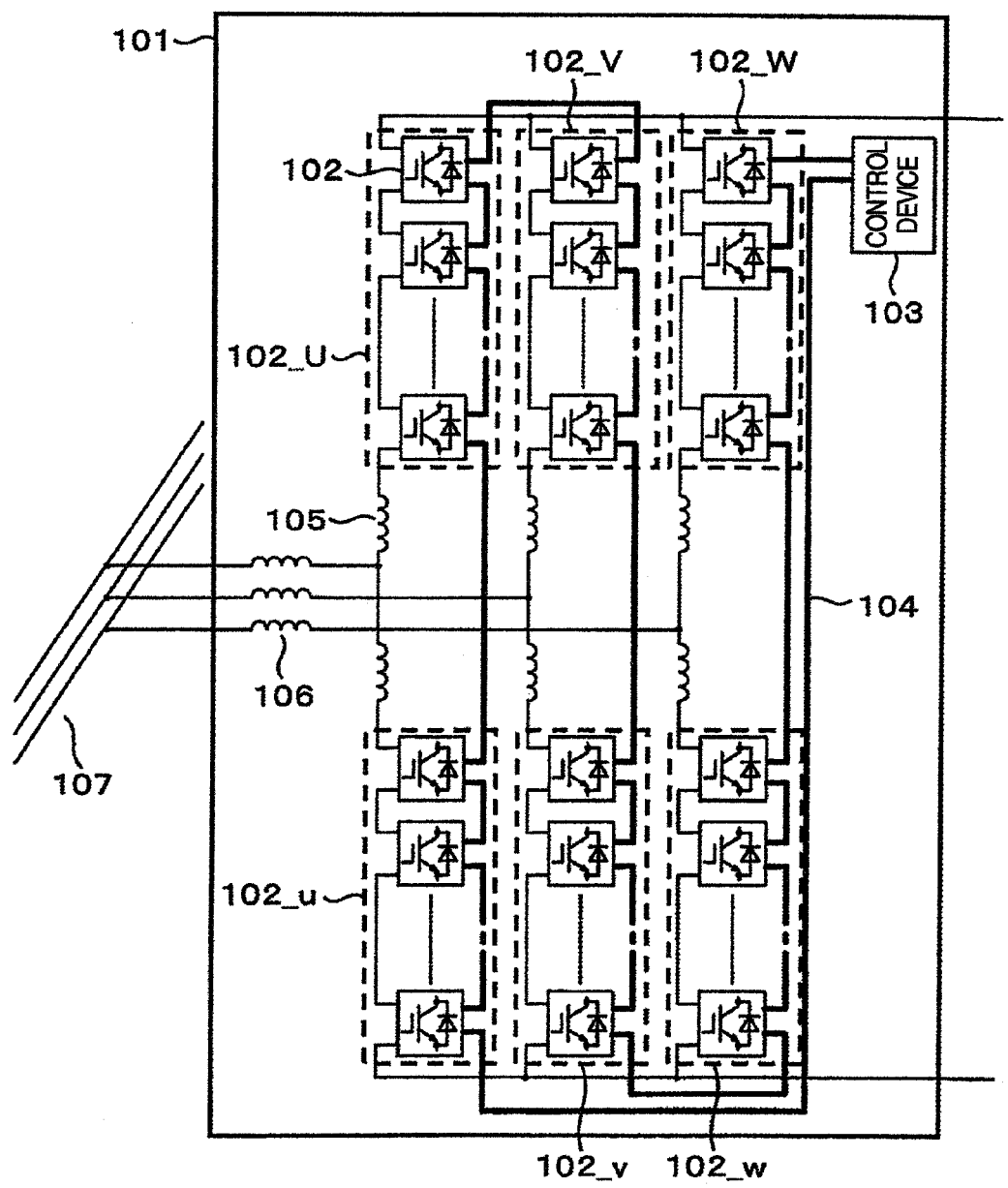
FIG. 1 is a configuration view of a power converter linked with a distribution system according to Embodiment 1.

FIG. 1 is a configuration view of a power converter having converter cells cascade connected and in a state linked with a system 107 according to one embodiment of the invention. A power converter 101 comprises converter cells 102, a control device 103, a signal line 104 for transmitting control signals from the control device 103 to the individual converter cells, buffer reactors 105, and interconnected reactors 106. In the drawing, 102_U, 102_V, 102_W, 102_u, 102_v and 102_w have the plural converter cells 102 connected in cascade and are defined as arms. Thus, the upper arms 102_U, 102_V and 102_W are called a U-phase positive side arm, a V-phase positive side arm and a W-phase positive side arm, and the lower arms 102_u, 102_v and 102_w are called a U-phase negative side arm, a V-phase negative side arm and a W-phase negative side arm. And, the converter cells 102 and the control device 103 are connected in a row by the signal line 104 as shown in FIG. 1.

Figure 2:
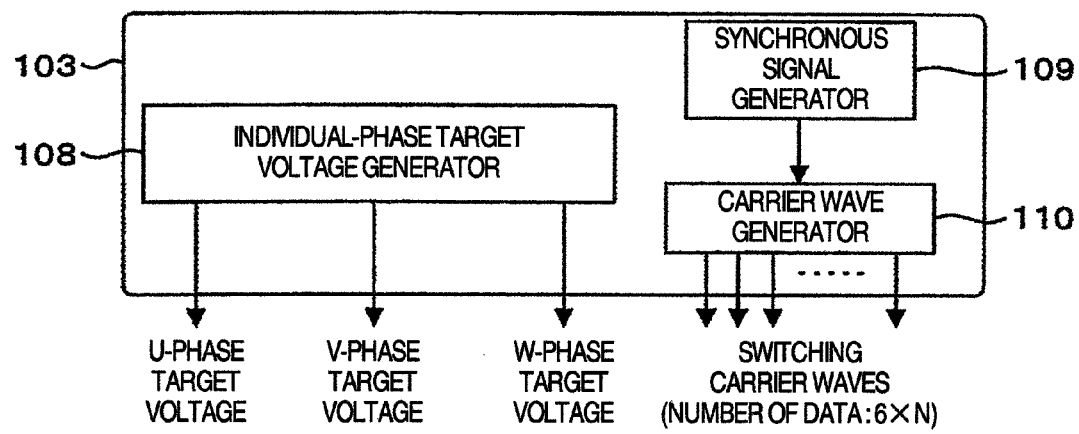
FIG. 2 is a schematic configuration view of a control device for controlling the power converter in Embodiment 1.

FIG. 2 shows a schematic configuration view of the control device 103. The control device 103 comprises an individual-phase target voltage generator 108 which outputs a target voltage of each of the U-phase, the V-phase and the W-phase, a synchronous signal generator 109 which generates an execution signal (hereinafter called a synchronous signal) for interrupt processing to be conducted by the control device 103 at every given time, and a carrier wave generator 110 which outputs a carrier wave for all converter cells within the power converter. Target voltages outputted from the individual-phase target voltage generator 108 are of the U-phase, the V-phase and the W-phase, and the phases of these three-phase target voltages are shifted by ⅓ cycle respectively. And, when it is determined that the number of the converter cells in the above-described arm is N, the number of data of the carrier wave for the converter cell outputted from the carrier wave generator 110 is 6N.

Figure 3:
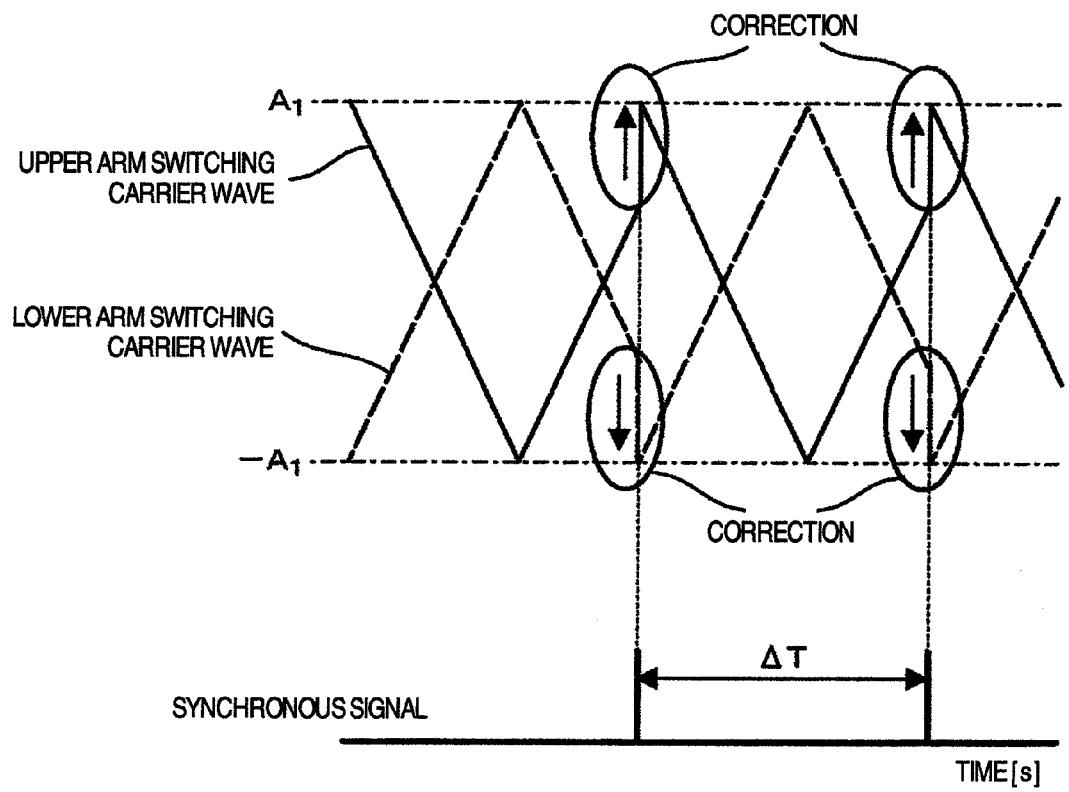
FIG. 3 is a diagram showing a state of synchronous processing between converter cells performed by the control device.

The control device 103 conducts interrupt processing of the carrier waves of the converter cells at every given time $\Delta T$ in order to synchronize the k-th (k=1, ..., N) converter cells mutually in each arm, and the synchronous signal generator 109 outputs a synchronous signal at the every given time $\Delta T$. When the above-described synchronous signal is inputted, the carrier wave generator 110 immediately outputs a carrier wave which is forcibly corrected to a prescribed value as shown in FIG. 3. Here, in a case where the k-th (k=1, ..., N) carrier wave for the upper arms is corrected to a prescribed value $A_1$, the k-th (k=1, ..., N) carrier wave for the lower arms is corrected to a prescribed value $-A_1$. For the synchronization of the carrier wave by using the above-described synchronous signal, one of the converter cells in the individual arms is synchronized for each input of the synchronous signal to the carrier wave generator 110. This procedure is conducted sequentially from the first to N-th converter cells in the individual arms. A series of work to synchronize between the above converter cells is called synchronous processing below. The above-described target voltages and carrier waves outputted from the individual-phase target voltage generator 108 and the carrier wave generator 110 are transmitted to the appropriate converter cells through the signal line 104.

Figure 4:
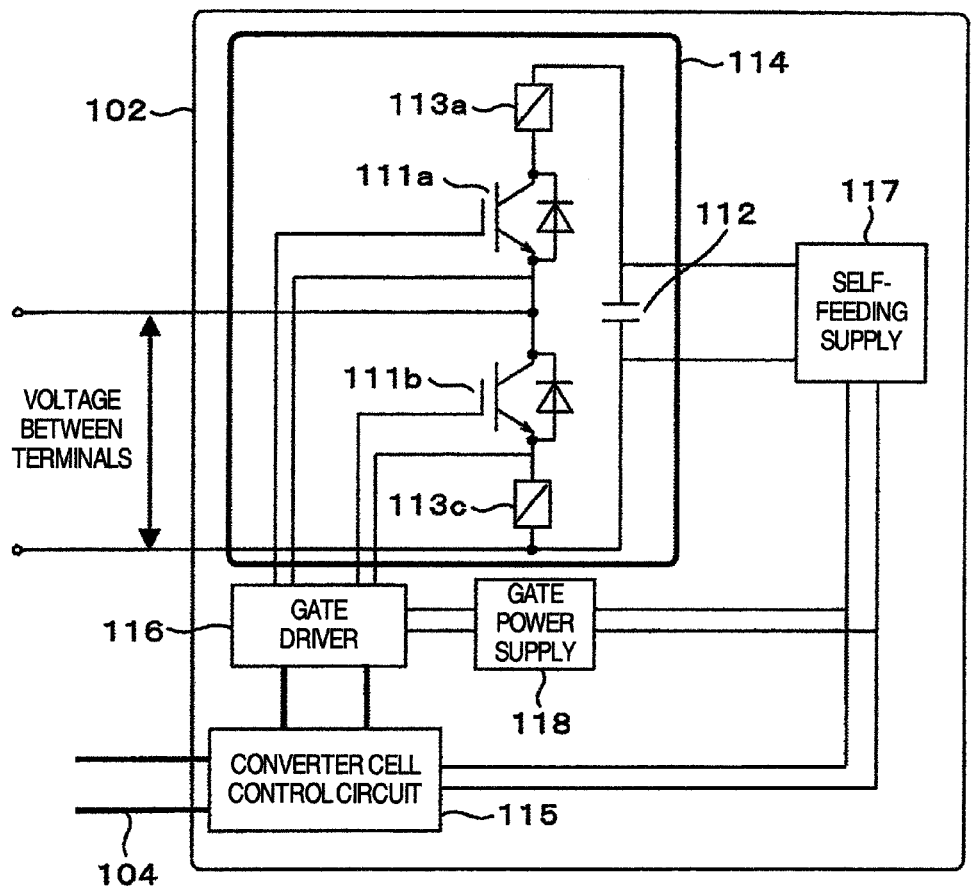
FIG. 4 is a configuration view of a converter cell which configures the power converter in Embodiment 1.

A configuration of the converter cell 102 is shown in FIG. 4. The converter cell 102 is comprised of a cell 114 comprising two IGBT elements 111, a DC capacitor 112 and two fuses 113, a converter cell control circuit 115, a gate driver 116, a self-feeding supply 117, and a gate power supply 118. As electric power for the converter cell control circuit 115 and the gate driver 116, the electric power charged into the DC capacitor 112 is supplied via the self-feeding supply 117 and the gate power supply 118.

Figure 5:
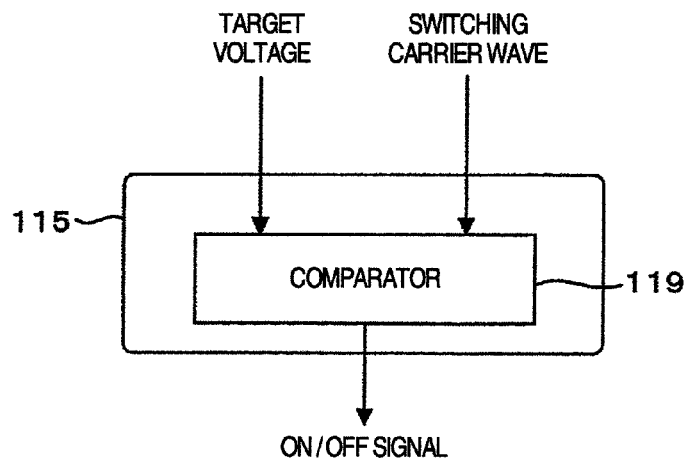
FIG. 5 is a schematic configuration view of a converter cell control circuit which configures the converter cell in Embodiment 1.

FIG. 5 shows a schematic configuration view of the converter cell control circuit. In the converter cell control circuit 115, the target voltage and the carrier wave for the converter cell transmitted from the control device 103 through the signal line 104 are compared for magnitude by a comparator 119, and the generated switch ON/OFF signal is outputted to the gate driver 116. According to the ON/OFF information, the gate driver 116 applies the voltage from the gate power supply 118 to the gate terminals of the two IGBT elements 111 to drive the IGBT elements 111. At this time, when one of the ON/OFF information of the two IGBT elements is ON, the other is OFF. And, an inversion of the ON/OFF signal for the positive side arm becomes the ON/OFF signal for the negative side arm.

To suppress the noise generated due to the output current harmonic component, the phases of the carrier waves of the k-th and k+first (k=1, ..., N−1) converter cells of each arm are shifted by a prescribed value respectively. This phase shift is performed by using the above-described synchronous processing. The frequency of the carrier wave for the converter cell is determined to meet the above-described equation. And, an output cycle ΔT of the above-described synchronous signal is determined according to the following equation (2).

$$\Delta T = 1/(n \times f_{carrier}) \qquad (2)$$

Figure 6:
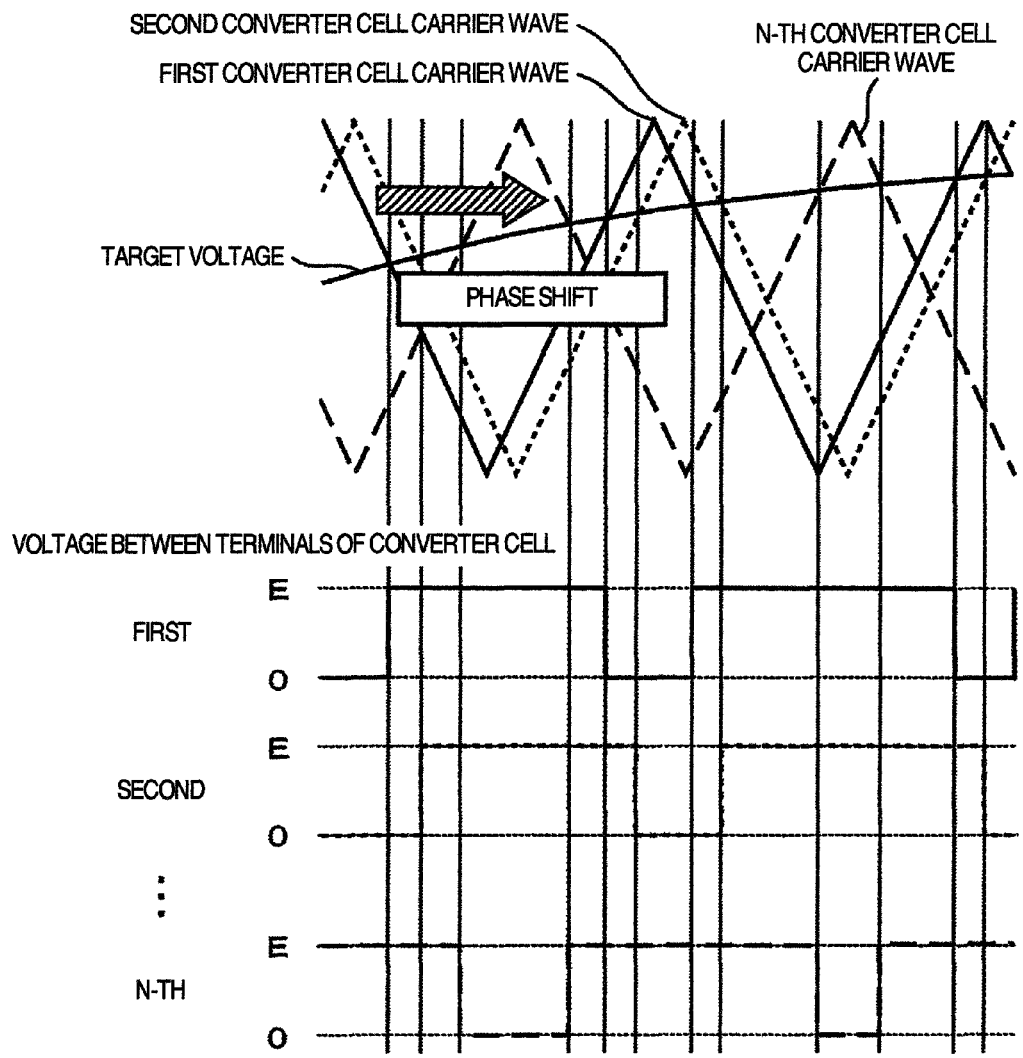
FIG. 6 is a diagram of converter cell carrier waves and target voltage waveform in individual phase arms and voltage waveforms between terminals of the converter cell in Embodiment 1.

FIG. 6 shows a magnitude relation between the carrier waves and the target voltage of the converter cell and the output voltages of the converter cell at the time. The upper section of FIG. 6 shows the carrier waves and the target voltage waveform of the converter cell. Meanwhile, the lower section shows the voltage waveforms between terminals of the individual converter cells when it is determined that the voltage between the terminals of the converter cell is E [V]. The each converter cell compares the target voltage and the converter cell carrier wave for magnitude as described above, and when the target voltage is larger, the voltage E [V] is generated in the converter cell by switching ON an IGBT element 111a and switching OFF an IGBT element 111b. Conversely, when the target voltage is smaller than the carrier wave for the each converter cell, the voltage applied to the converter cell 102 becomes 0 [V] by switching OFF the IGBT element 111a and switching ON the IGBT element 111b. Thus, the output voltages of the individual phases become a total of the voltages applied to the converter cells 102. As described above, the ON/OFF timing of the converter cells in the arms is shifted when the phases of the individual converter cell carrier waves in the arms are shifted.

Figure 7:
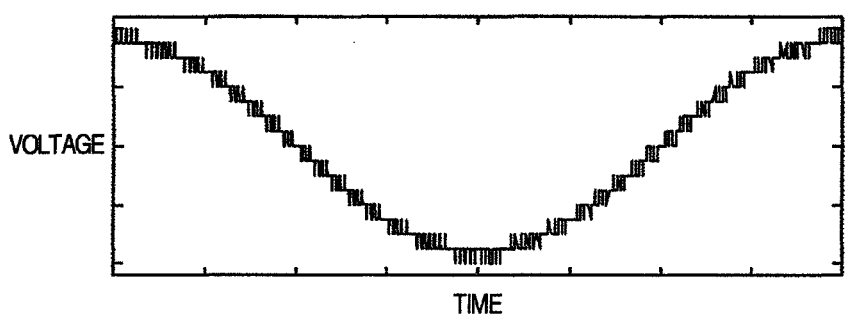
FIG. 7 is an example of a composite pulse voltage waveform of the arm.

FIG. 7 shows a composite pulse voltage waveform (arm voltage waveform) of the arm when the power converter is operated as described above.

Figure 8:
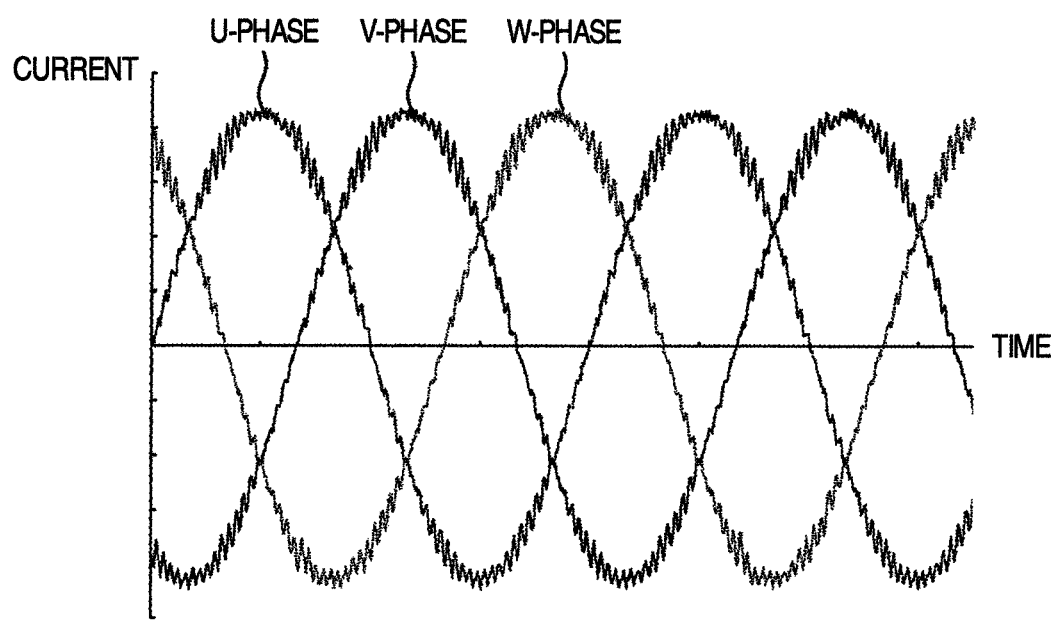
FIG. 8 is an example of output current waveforms of the power converter.

When the present invention is used, an output current waveform becomes as shown in FIG. 8, and the frequency $f_{ripple}$ of the output current harmonic component exceeds the maximum frequency of the human audible range. Therefore, sounds generated from the interconnected reactor, distribution system, etc. due to the $f_{ripple}$ cannot be recognized by human beings. As a result, it becomes possible to suppress the noise.

[Embodiment 2]

Figure 9:
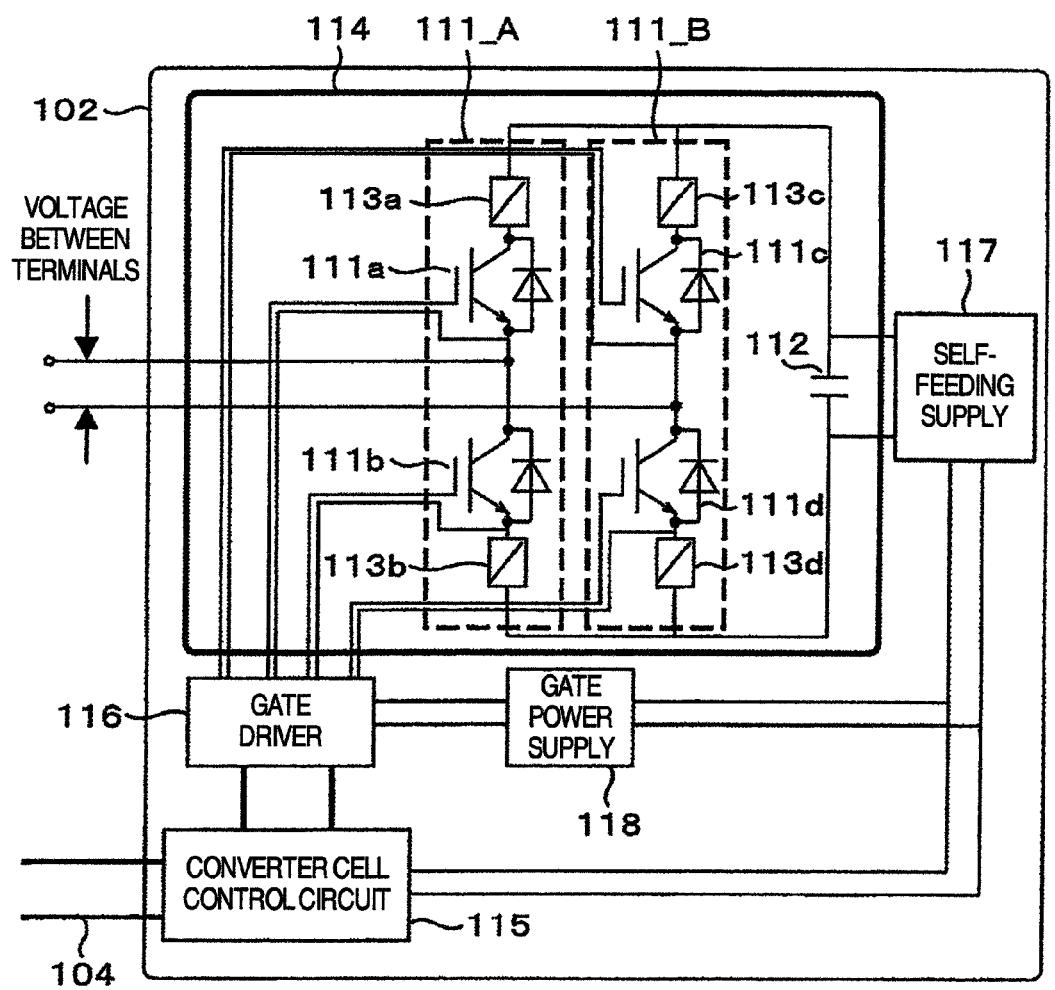
FIG. 9 is a configuration view of a converter cell which configures the power converter in Embodiment 2.

In Embodiment 1 described above, the converter cells 102 are configured of a so-called half bridge type circuit as shown in FIG. 4, but they may be configured of a full bridge type circuit as shown in FIG. 9. In the drawing, 111_A designates an IGBT element 111a and an IGBT element 111b, and 111_B designates an IGBT element 111c and an IGBT element 111d. When 111_A and 111_B are defined as legs respectively, the converter cell 102 in this embodiment is configured of a cell 114, which comprises the legs 111_A and 111_B each having two IGBT elements 111, a DC capacitor 112 and four fuses 113, a converter cell control circuit 115, a gate driver 116, a self-feeding supply 117 and a gate power supply 118.

Figure 10:
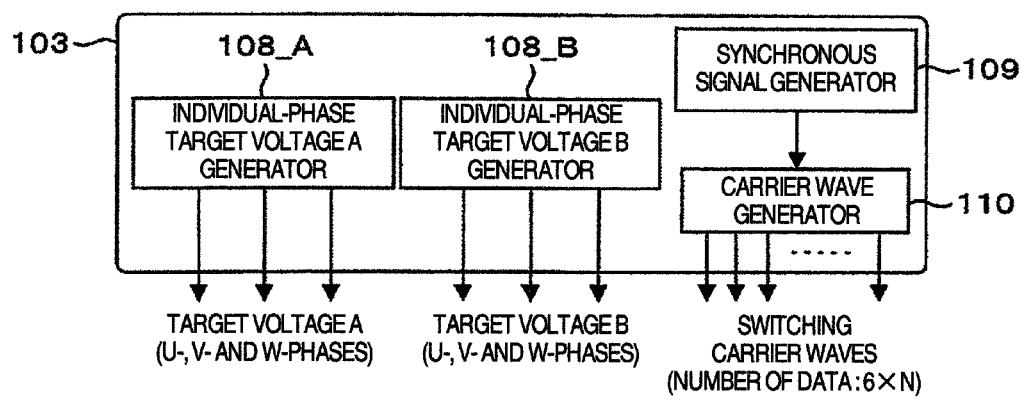
FIG. 10 is a schematic configuration view of a control device for controlling the power converter in Embodiment 2.

FIG. 10 shows a schematic configuration view of the control device 103 in this embodiment. In the full bridge type circuit of this embodiment, the above-described legs 111_A and 111_B control the switching operation according to two types of target voltages which are called as target voltages A and B, and the control device 103 outputs the two types of target voltages and the converter cell carrier wave. The target voltage A is a target voltage for controlling the switching operation of the leg 111_A, and the target voltage B is a target voltage for controlling the switching operation of the leg 111_B, and it is determined that the phases of the target voltages A and B are mutually shifted by ½ cycle.

Figure 11:
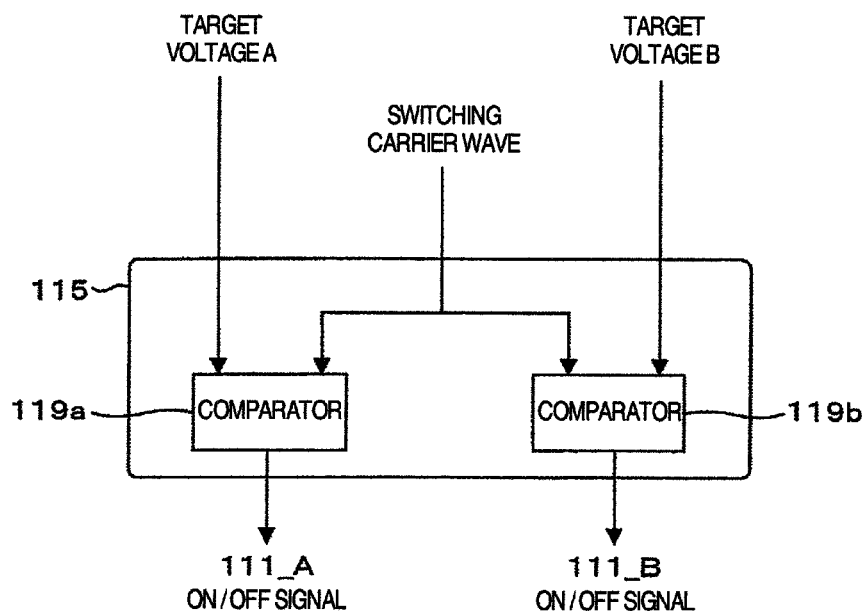
FIG. 11 is a schematic configuration view of a converter cell control circuit which configures the converter cell in Embodiment 2.

FIG. 11 shows a schematic configuration view of the converter cell control circuit. The carrier wave outputted from the control device 103 and the individual-phase target voltages A and B also outputted from the control device 103 are respectively compared for magnitude by the comparators 119, and ON/OFF signals for the legs 111_A and 111_B are outputted.

Figure 12:
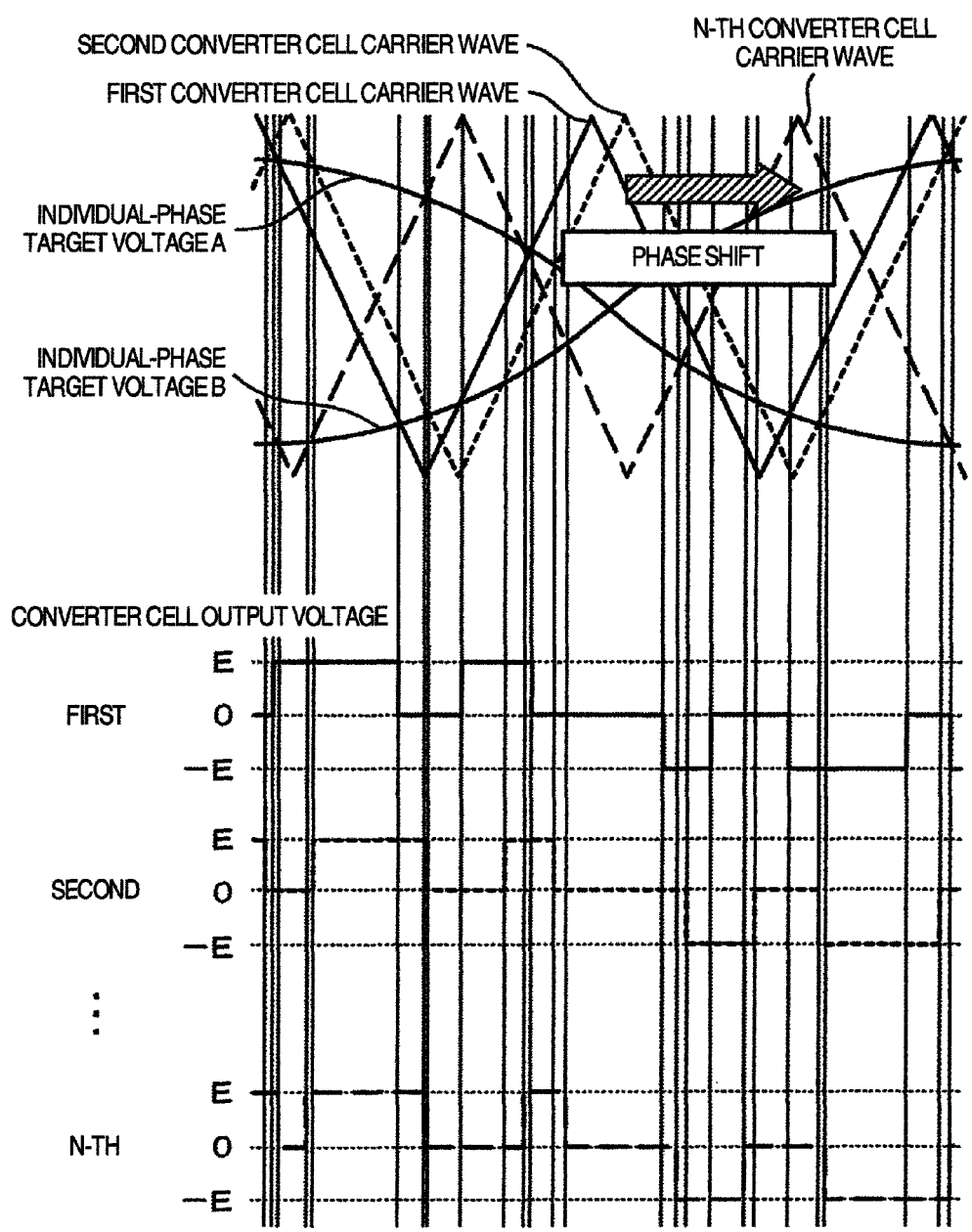
FIG. 12 is a diagram of converter cell carrier waves and target voltage waveform in individual phase arms and voltage waveforms of the converter cells in Embodiment 2.

FIG. 12 shows a magnitude relation between carrier waves and target voltages of the converter cells and output voltages of the converter cells at the time in this embodiment. In this embodiment, the target voltage A and the converter cell carrier waves are compared for magnitude, and when the target voltage A is larger in the leg 111_A, the IGBT element 111a is switched ON, and the IGBT element 111b is switched OFF. Similarly, when the target voltage B is larger in the leg 111_B, the IGBT element 111c is switched ON, and the IGBT element 111d is switched OFF. In FIG. 12, the lower part shows output current waveforms of the converter cells when the IGBT element 111a is switched ON, the IGBT element 111b is switched OFF, the IGBT element 111c is switched OFF, the IGBT element 111d is switches ON and the voltage between terminals of the converter cells is determined to be E [V]. When the IGBT element 111a is switched OFF, the IGBT element 111b is switched ON, the IGBT element 111c is switched ON and the IGBT element 111d is switched OFF, and the voltage between the terminals of the converter cell becomes −E [V], and when the IGBT elements 111a and 111c and those 111b and 111d have the same ON/OFF, the voltage between the terminals of the converter cell becomes 0 [V]. It is adequate to determine that the frequency of a driving carrier wave for each converter cell in the power converter of this embodiment meets the following equation (3).

$$f_{carrier} \geq f_{audibility\_max} \div 2N \qquad (3)$$

[Embodiment 3]

In Embodiments 1 and 2, the outputs of the control device 103 are the target voltages of each of the U-phase, the V-phase and the W-phase and the carrier waves of the converter cells but may be individual-phase target voltages and synchronous signals.

Figure 13:
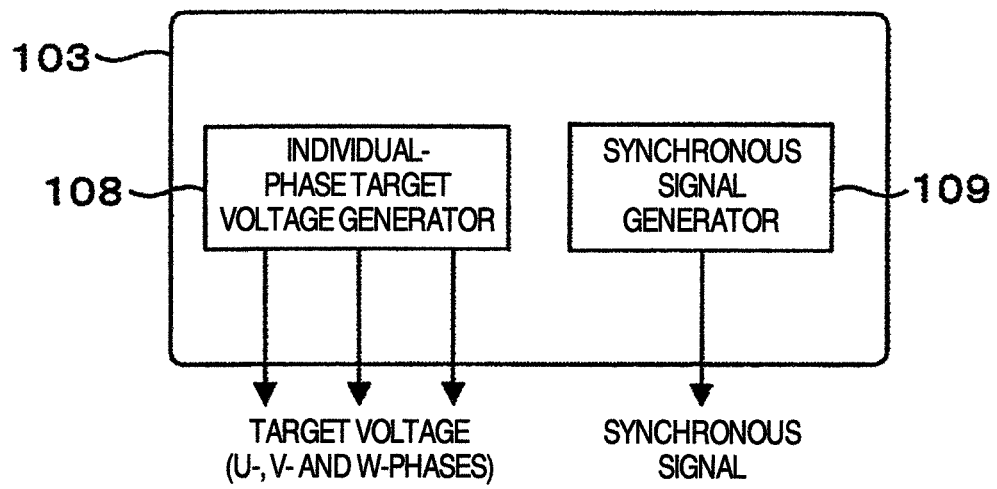
FIG. 13 is a schematic configuration view of a control device for controlling the power converter in Embodiment 3.
Figure 14:
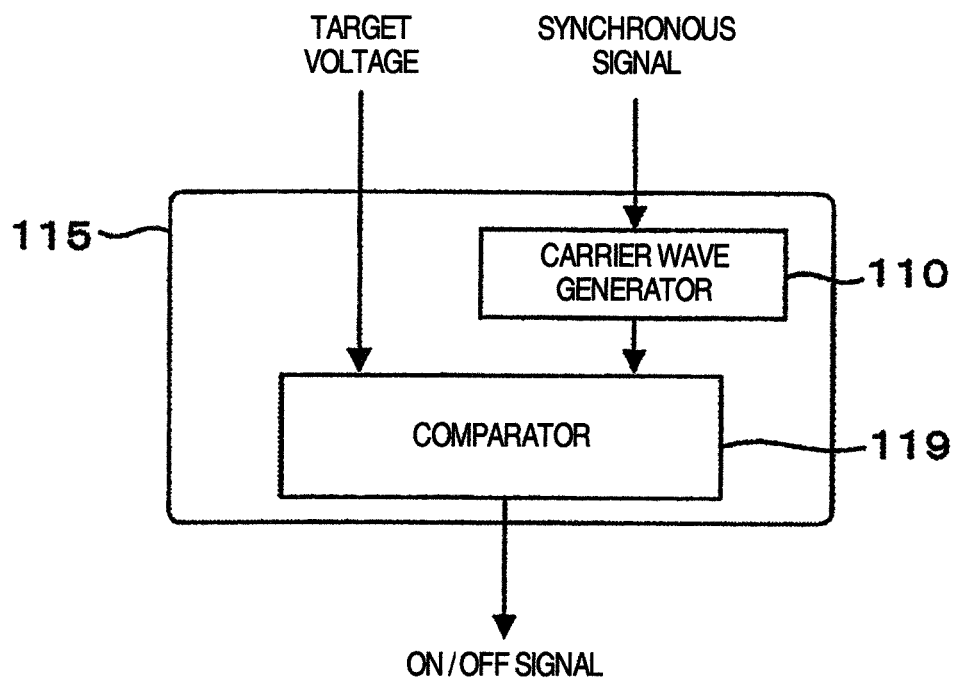
FIG. 14 is a schematic configuration view of the converter cell control circuit configuring the converter cell in Embodiment 3.

FIG. 13 shows a schematic configuration view of the control device 103 when the converter cell 102 is configured of a half bridge type circuit, and FIG. 14 shows a schematic configuration view of the converter cell control circuit 115. In this embodiment, the synchronous signal is outputted to the appropriate converter cell control circuit 115 at the every given time ΔT. And, in the converter cell control circuit 115, the carrier wave outputted from the carrier wave generator 110, which forcefully corrects a value by the synchronous signal inputted at every cycle ΔT, is compared with the target voltage outputted from the control device 103 for the magnitude by the comparator 119, and the ON/OFF signal is outputted to the gate driver 116 according to the magnitude relation.

[Embodiment 4]

In Embodiment 3, the converter cell 102 is configured of the half bridge type circuit as shown in FIG. 4, but it may be a full bridge type circuit as shown in FIG. 9.

Figure 15:
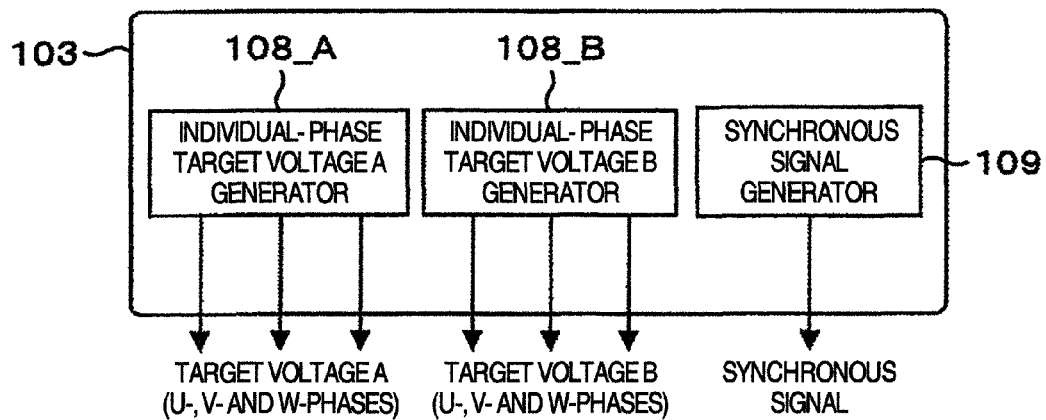
FIG. 15 is a schematic configuration view of a control device for controlling the power converter in Embodiment 4.
Figure 16:
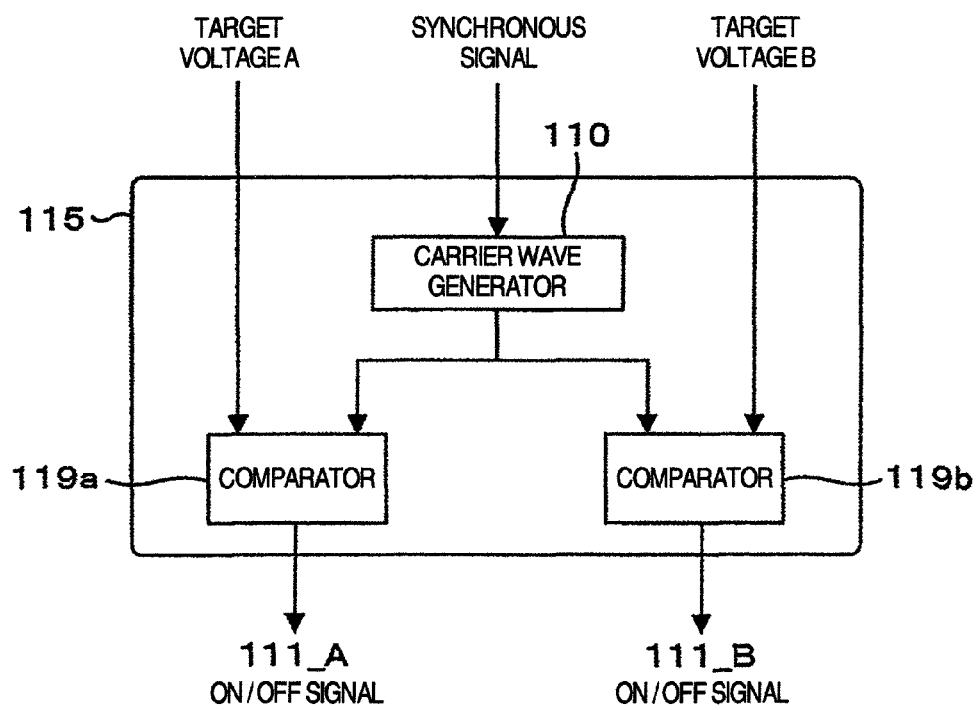
FIG. 16 is a schematic configuration view of the converter cell control circuit configuring the converter cell in Embodiment 4.

FIG. 15 shows a schematic configuration view of the control device 103, and FIG. 16 shows a schematic configuration view of the converter cell control circuit 115. The outputs of the control device 103 are the target voltages A and B outputted from individual-phase target voltage generators 108_A and 108_B and the synchronous signal outputted from the synchronous signal generator 109. The converter cell control circuit 115 has as an input the synchronous signal outputted from the control device 103, compares the carrier wave outputted from the carrier wave generator 110 and the target voltages A and B also outputted from the control device 103 for magnitude by the comparator 119, and outputs the ON/OFF signal to the gate driver 116 according to the magnitude relation.

[Embodiment 5]

In Embodiments 1 to 4, the individual-phase target voltages and the switching carrier waves of the individual converter cells or the synchronous signal is outputted from the control device 103, but the switching ON/OFF signals for the individual converter cells may be used instead.

Figure 17:
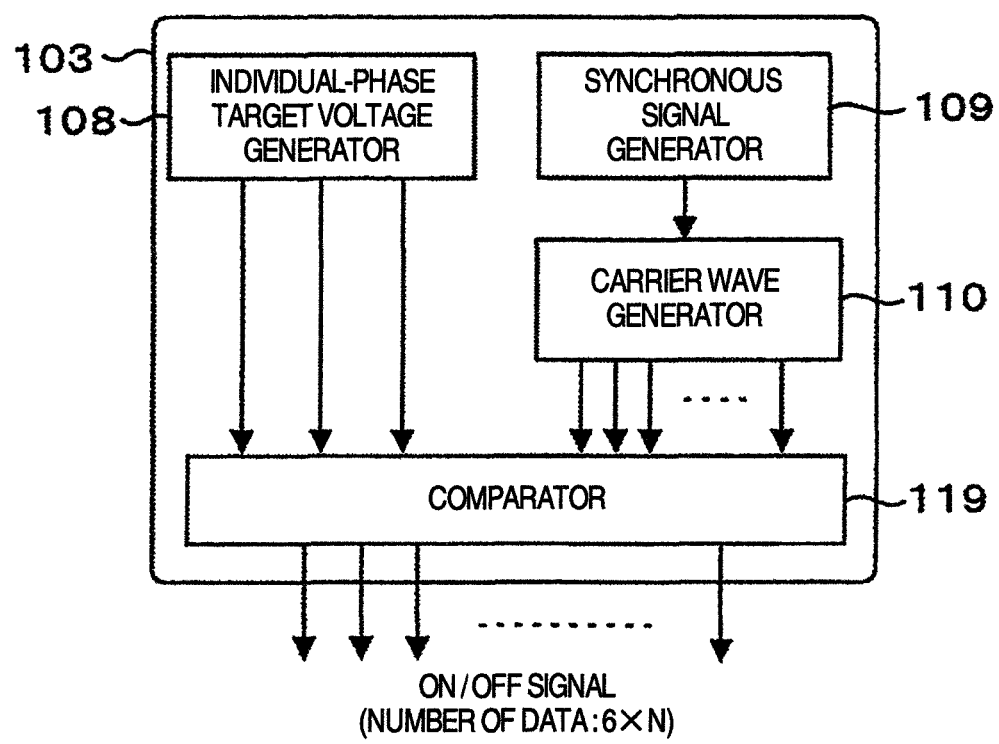
FIG. 17 is a schematic configuration view of a control device for controlling the power converter when the circuit configuration of the converter cell is a half bridge type in Embodiment 5.
Figure 18:
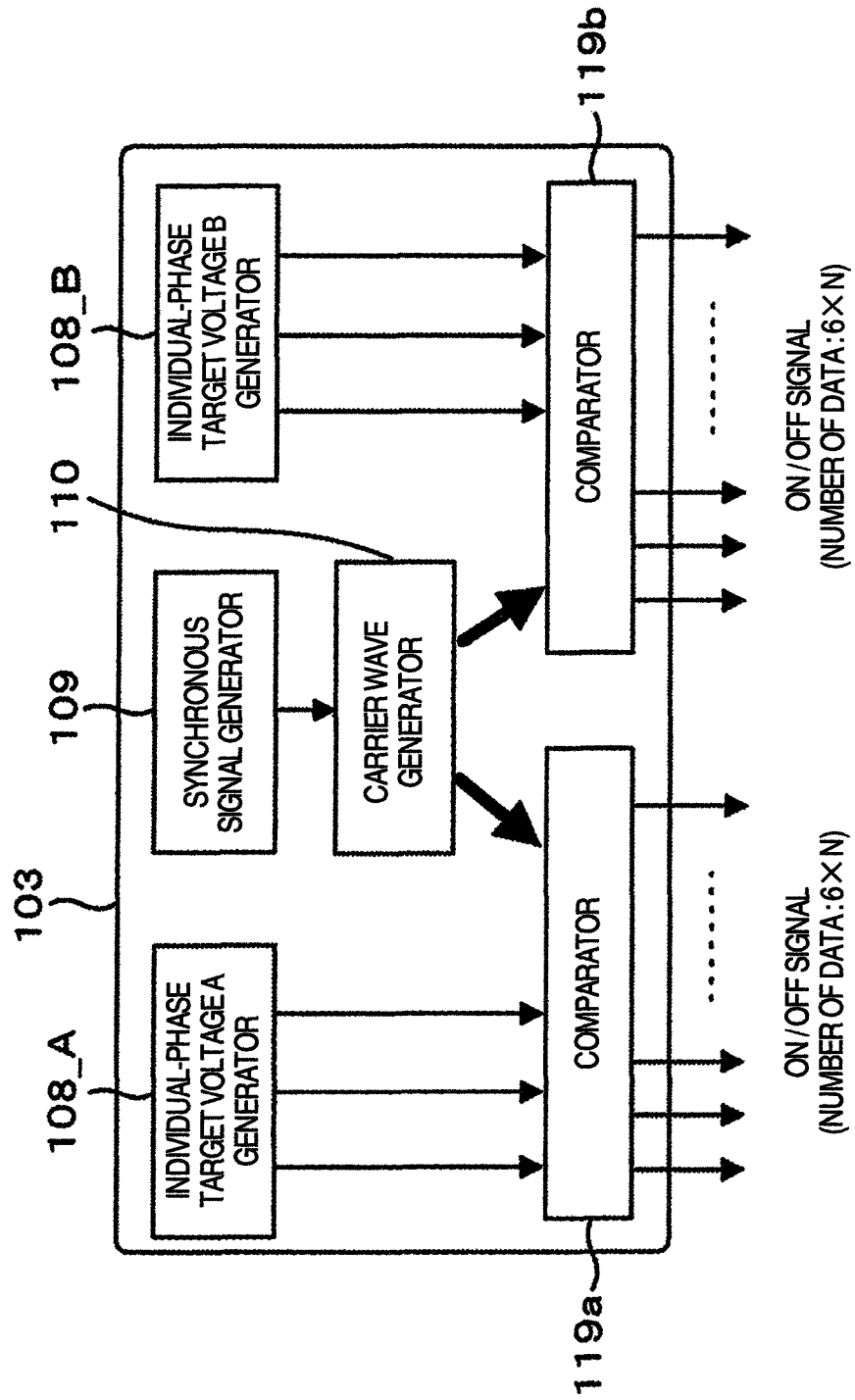
FIG. 18 is a schematic configuration view of a control device for controlling the power converter when the circuit configuration of the converter cell is a full bridge type in Embodiment 5.

FIG. 17 shows a schematic configuration view of the control device 103 when the converter cell 102 is configured of the half bridge type circuit. FIG. 18 shows a schematic configuration view of the control device 103 when the converter cell 102 is configured of the full bridge circuit. In this embodiment, the switching operations of all the converter cells 102 within the power converter 101 are computed by the control device 103.

[Embodiment 6]

Figure 19:
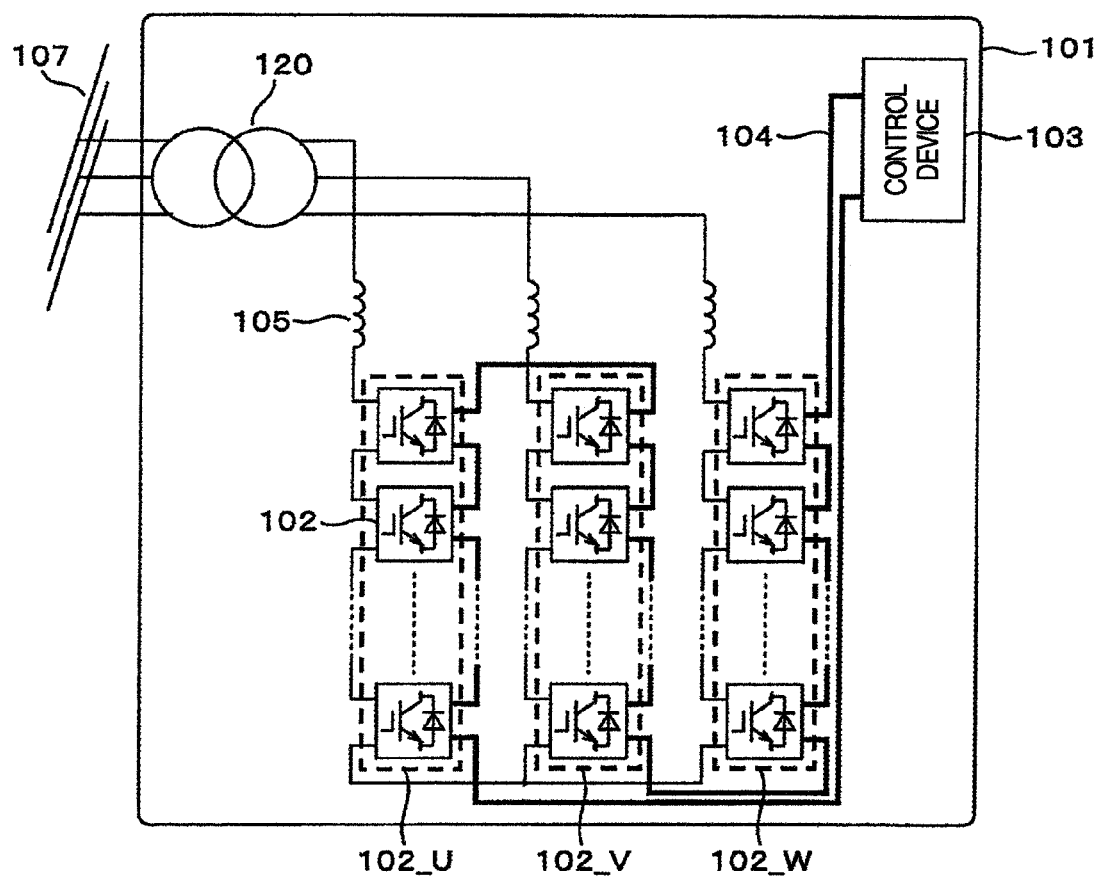
FIG. 19 is a configuration view of a power converter linked with a distribution system in Embodiment 6.

The power converter of the invention can have the configuration shown in FIG. 19 in addition to that shown in FIG. 1. In this embodiment, the power converter 101 is configured of individual arms 102_U, 102_V and 102_W of the U-phase, the V-phase and the W-phase, a signal line 104, buffer reactors 105 and a transformer 120 which is linked with a distribution system 107. The converter cells 102 and the control device 103 are connected in a row by the signal line 104 as shown in FIG. 19. The individual-phase target voltages of the U-phase, the V-phase and the W-phase and the carrier waves of the converter cells are outputted by the control device 103 and transmitted to the individual converter cells 102 through the signal line 104. The converter cell 102 may be configured of either the half bridge type circuit shown in FIG. 4 or the full bridge type circuit shown in FIG. 9.

[Embodiment 7]

In Embodiment 6, the outputs of the control device 103 are the individual-phase target voltages and the carrier waves of the converter cells but may be the individual-phase target voltages and synchronous signals. At the time, the control device 103 and the converter cell control circuit 115 are configured in the same manner as those described in Embodiment 3 or Embodiment 4.

[Embodiment 8]

The outputs of the control device 103 in Embodiments 6 and 7 are the individual-phase target voltages and the phases of the switching carrier waves of the individual converter cells or the synchronous signals but may be the individual-phase target voltages and the switching ON/OFF signals for the converter cells. At the time, the control device 103 and the converter cell control circuit 115 are configured in the same manner as those described in Embodiment 5.

[Embodiment 9]

In Embodiments 1 to 8, the control signal is transmitted from the control device 103 to the converter cell control circuit 115 through the signal line 104, but it may be transmitted wirelessly. Thus, the signal line 104 in the power converter can be eliminated, and maintenance and inspection works for the apparatus can be reduced.

Figure 20:
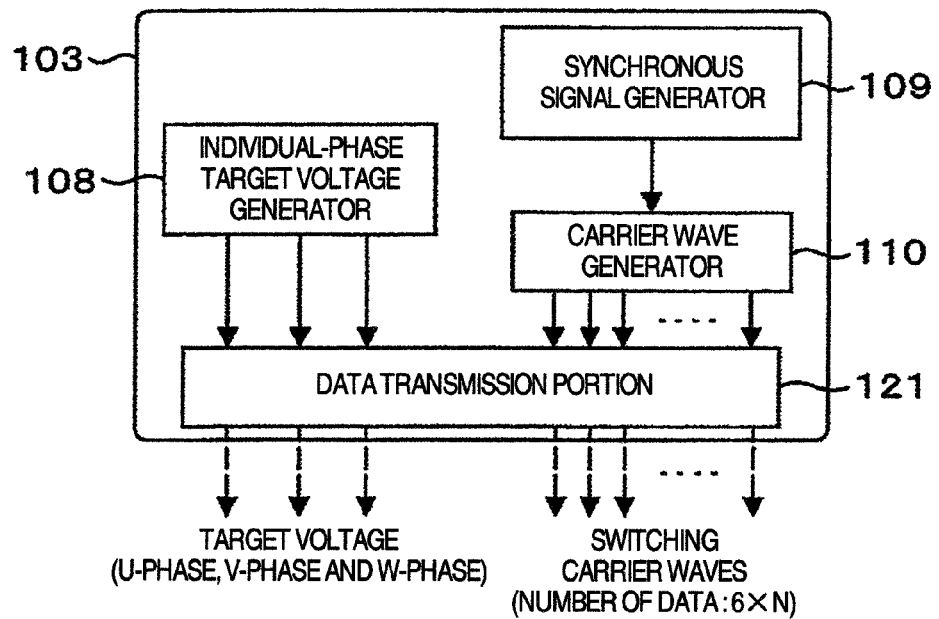
FIG. 20 is a schematic configuration view of a control device for controlling the power converter in Embodiment 9.
Figure 21:
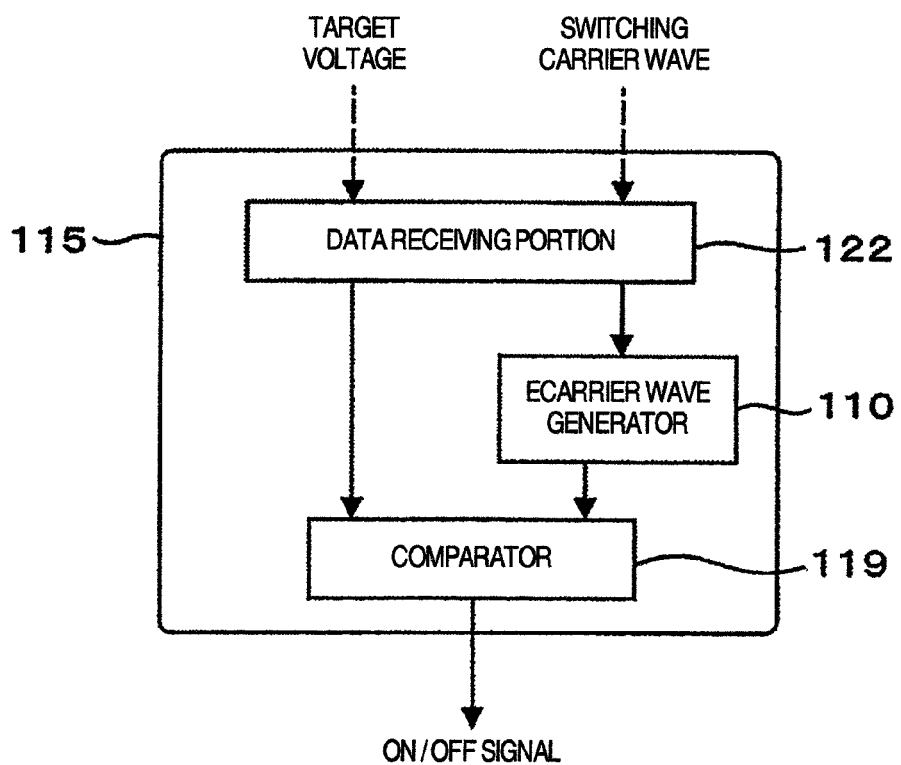
FIG. 21 is a schematic configuration view of the converter cell control circuit configuring the converter cell in Embodiment 9.

FIG. 20 shows a schematic configuration view of the control device 103 configured as shown in Embodiment 1, and FIG. 21 shows a schematic configuration view of the converter cell control circuit 115. The control device 103 is newly provided with a data transmission portion 121 for transmitting data, and the converter cell control circuit 115 is newly provided with a data receiving portion 122 for receiving data. The data transmission portion 121 transmits a target voltage of each of the U-phase, the V-phase and the W-phase and carrier waves of 6N converter cells 102. The receiving portion 122 receives the appropriate target voltages and carrier waves respectively.

The control devices 103 and the converter cell control circuits 115 of Embodiments 2 to 8 are also configured in the same manner.

The present invention can be used for a static synchronous compensator (STATCOM), a back-to-back system (such as a frequency converter), a high voltage direct current system (HVDC), a motor drive, etc. in addition to the power converter for electric power distribution.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power converter provided with a plurality of arms which are each comprised of a plurality of converter cells and having a plural phase construction, wherein each phrase corresponds to an arm configured by connecting the plurality of converter cell in series, comprising a controller configured to:
   conduct interrupt processing of carrier waves of the converter cells to synchronize control of corresponding converter cells of the different arms,
   wherein each carrier wave is shifted by a predetermined shift value at each arm such that each phase is different from each other, and
   wherein each converter cell is driven, at each converter cell, by comparing a common instructed value per each arm and the carrier wave;
   operate frequencies of the carrier waves of the converter cells in a state larger than a value which is obtained by dividing a maximum frequency of a human audible frequency band by the number of the converter cells in the arms; and
   shift the value of the carrier wave at any converter cell to the predetermined shift value when the shift value of the carrier wave at that converter cell is displaced from the predetermined shift valued.

2. The power converter according to claim 1, further comprising:
   interconnected reactors;
   buffer reactors; and
   wherein:
      control of the different arms and converter cells is in accordance with a control device and a signal line coupled to transmit a control signal from the control device to the converter cells, and
      the arms are arranged on positive and negative sides of each of three phases.

3. The power converter according to claim 1, wherein the converter cell is provided with:
   a capacitor for storing electric power;
   fuses for cutting off electric current in case of overcurrent;

a cell configured with a plurality of switching elements connected in a half bridge state;

a converter cell control circuit for outputting a control signal for the switching elements;

a gate driver for applying a voltage to the switching elements according to the control signal outputted from the converter cell control circuit;

a gate power supply for supplying necessary electric power to the gate driver; and a self-feeding supply for supplying necessary electric power to the gate power supply and the converter cell control circuit.

4. The power converter according to claim 1, wherein control of the different arms and converter cells is provided by:

a synchronous signal generator for generating a synchronous signal at every given time;

a carrier wave generator for generating a carrier wave for the converter cell after having as an input the synchronous signal which is outputted from the synchronous signal generator; and an individual-phase target voltage generator for generating a target voltage of each of three phases which are mutually shifted by ⅓ cycle.

5. The power converter according to claim 1, wherein a converter cell control circuit is provided with a comparator which outputs to a gate driver an ON/OFF signal for switching elements of a converter cell according to a magnitude relation between a target voltage and a carrier wave for the converter cell.

6. The power converter according to claim 1, wherein the converter cell is provided with:

a capacitor for storing electric power;

fuses for cutting off an electric current in case of overcurrent;

a cell configured with a first leg and a second leg, which are configured with a plurality of switching elements connected in series, connected in a full bridge state;

a converter cell control circuit for outputting a control signal for the switching elements;

a gate driver for applying a voltage to the switching elements according to the control signal outputted from the converter cell control circuit;

a gate power supply for supplying necessary electric power to the gate driver; and a self-feeding supply for supplying necessary electric power to the gate power supply and the converter cell control circuit.

7. The power converter according to claim 1, wherein control of the different arms and converter cells is provided by:

a synchronous signal generator for generating a synchronous signal at every given time;

a carrier wave generator for generating a carrier wave for the converter cell after having as an input the synchronous signal which is outputted from the synchronous signal generator;

a first individual-phase target voltage generator for generating a target voltage of each of three phases which are mutually shifted by ⅓ cycle; and a second individual-phase target voltage generator for outputting a target voltage with the phase shifted by ½ cycle with respect to the target voltage which is outputted from the first individual-phase target voltage generator.

8. The power converter according to claim 1, wherein a converter cell control circuit is provided with:

a first comparator for generating an ON/OFF signal for switching elements, configuring a first leg of each converter cell, according to the magnitude relation between a target voltage outputted from a the first individual-phase target voltage generator and a carrier wave for the converter cell outputted from a carrier wave generator; and a second comparator for generating an ON/OFF signal for switching elements, configuring a second leg of each converter cell, according to the magnitude relation between a target voltage outputted from a second individual-phase target voltage generator and a carrier wave for the converter cell outputted from the carrier wave generator.

9. The power converter according to claim 1, wherein control of the different arms and converter cells is provided by:

a synchronous signal generator for generating a synchronous signal at every given time; and an individual-phase target voltage generator for generating a target voltage of each of three phases which are mutually shifted by ⅓ cycle.

10. The power converter according to claim 1, wherein a converter cell control circuit is provided with:

a carrier wave generator for outputting a carrier wave for the converter cell after having as an input a synchronous signal which is outputted from a synchronous signal generator; and a comparator for generating an ON/OFF signal for a switching element of a converter cell according to the magnitude relation between a carrier wave for the converter cell outputted from the carrier wave generator and a target voltage outputted from an individual-phase target voltage generator.

11. The power converter according to claim 1, wherein control of the different arms and converter cells is in accordance with a control device comprising:

a synchronous signal generator for generating a synchronous signal at every given time;

a first individual-phase target voltage generator for generating a target voltage of each of three phases which are mutually shifted by ⅓ cycle; and a second individual-phase target voltage generator for outputting a target voltage with the phase shifted by ½ cycle with respect to the target voltage which is outputted from the first individual-phase target voltage generator.

12. The power converter according to claim 1, wherein a converter cell control circuit is provided with:

a carrier wave generator for outputting a carrier wave for the converter cell after having as an input a synchronous signal which is outputted from a synchronous signal generator;

a first comparator for generating an ON/OFF signal for a switching element configuring a first cell according to the magnitude relation between a target voltage outputted from a first individual-phase target voltage generator and a carrier wave for the converter cell outputted from the carrier wave generator; and a second comparator for generating an ON/OFF signal for a switching element configuring a second cell according to the magnitude relation between a target voltage outputted from a second individual-phase target voltage generator and a carrier wave for the converter cell outputted from the carrier wave generator.

13. The power converter according to claim 1, wherein control of the different arms and converter cells is in accordance with a control device comprising:

an individual-phase target voltage generator for generating a target voltage of each of three phases which are mutually shifted by ⅓ cycle;

a synchronous signal generator for generating a synchronous signal at every given time;

a carrier wave generator for generating a carrier wave for the converter cell after having as an input the synchronous signal which is outputted from the synchronous signal generator; and a comparator which outputs to a converter cell control circuit an ON/OFF signal for a switching element of the converter cell according to a magnitude relation between the target voltage and the carrier wave for the converter cell.

14. The power converter according to claim 1, wherein control of the different arms and converter cells is in accordance with a control device comprising:

a first individual-phase target voltage generator for generating a target voltage of each of three phases which are mutually shifted by ⅓ cycle;

a second individual-phase target voltage generator for outputting a target voltage with the phase shifted by ½ cycle with respect to the target voltage which is outputted from the first individual-phase target voltage generator;

a synchronous signal generator for generating a synchronous signal at every given time;

a carrier wave generator for generating a carrier wave for the converter cell after having as an input the synchronous signal which is outputted from the synchronous signal generator;

a first comparator for generating an ON/OFF signal for switching elements, configuring a first leg of each converter cell, according to the magnitude relation between the target voltage outputted from the first individual-phase target voltage generator and the carrier wave outputted from the carrier wave generator; and a second comparator for generating an ON/OFF signal for switching elements, configuring a second leg of each converter cell, according to the magnitude relation between the target voltage outputted from the second individual-phase target voltage generator and the carrier wave outputted from the carrier wave generator.

15. The power converter according to claim 1, further comprising:

a transformer;

a buffer reactor; and wherein:

control of the different arms and converter cells is in accordance with a control device and a signal line couple to transmit a control signal from the control device to the converter cells, and the arms are arranged on each of three phases.

16. The power converter according to claim 1, further comprising:

interconnected reactors;

buffer reactors; and wherein;

control of the different arms and converter cells is in accordance with a control device, the arms are arranged on positive and negative sides of each of three phases, and a control signal between the control device and a converter cell control circuit is transmitted wirelessly.

17. The power converter according to claim 1, further comprising:

a transformer;

a buffer reactor; and wherein:

control of the different arms and converter cells is in accordance with a control device, the arms are arranged on each of three phases, and a control signal between the control device and a converter cell control circuit is transmitted wirelessly.

18. A power converting method for a power converter provided with a plurality of arms which are each comprised of a plurality of converter cells and having a plural phase construction, wherein each phase corresponds to an arm configured by connecting the plurality of converter calls in series, comprising:

conducting interrupt processing of carrier waves of the converter cells to synchronize control of corresponding converter cells of the different arms, wherein each carrier wave is shifted by a predetermined shift value at each arm such that each phase is different from each other, and wherein each converter cell is driven, at each converter cell, by comparing a common instructed value per each arm and the carrier wave;

operating frequencies of the carrier waves of the converter cells in a state larger than a value which is obtained by dividing a maximum frequency of a human audible frequency band by the number of the converter cells in the arms; and shifting the value of the carrier wave at any converter cell to the predetermined shift value when the shift value of the carrier wave at that converter cell is displaced from the predetermined shift valued.

19. The power converter according to claim 1, wherein shifting the value of the carrier wave to the predetermined shift value results in a phase shift which will ensure that noise frequency of the converter cells is not lower than the maximum frequency of a human audible frequency band.

20. The power converting method according to claim 18, wherein shifting the value of the carrier wave to the predetermined shift value results in a phase shift which will ensure that noise frequency of the converter cells is not lower than the maximum frequency of a human audible frequency band.

* * * * *